(12) United States Patent
Sato et al.

(10) Patent No.: US 9,005,066 B2
(45) Date of Patent: Apr. 14, 2015

(54) MOTOR ASSEMBLY WITH SPEED REDUCER

(75) Inventors: Koji Sato, Iwata (JP); Takahide Saito, Iwata (JP); Masafumi Nakakoji, Iwata (JP); Naotsugu Kitayama, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/232,297

(22) PCT Filed: Jul. 11, 2012

(86) PCT No.: PCT/JP2012/067690
§ 371 (c)(1),
(2), (4) Date: Jan. 13, 2014

(87) PCT Pub. No.: WO2013/011892
PCT Pub. Date: Jan. 24, 2013

(65) Prior Publication Data
US 2014/0162826 A1    Jun. 12, 2014

(30) Foreign Application Priority Data
Jul. 19, 2011  (JP) .................................. 2011-157937
Jul. 19, 2011  (JP) .................................. 2011-158021

(51) Int. Cl.
*F16H 1/32*        (2006.01)
*H02K 7/116*       (2006.01)

(52) U.S. Cl.
CPC ................. *F16H 1/321* (2013.01); *H02K 7/116* (2013.01); *F16H 1/32* (2013.01)

(58) Field of Classification Search
CPC ................. F16H 1/32; F16H 2001/323; F16H 2001/325; F16H 2001/327; F16H 13/08
See application file for complete search history.

(56) References Cited

U.S. PATENT DOCUMENTS 6,024,549 A  *  2/2000  Lee ................................ 418/135
8,393,424 B2 *  3/2013  Makino et al. ............. 180/65.51
(Continued)

FOREIGN PATENT DOCUMENTS

| JP | 62-093565 | 4/1987 |
| JP | 11-127556 | 5/1999 |

(Continued)

OTHER PUBLICATIONS

International Search Report issued Sep. 18, 2012 in International (PCT) Application No. PCT/JP2012/067690.

(Continued)

*Primary Examiner* — Robert A Siconolfi
*Assistant Examiner* — Huan Le
(74) *Attorney, Agent, or Firm* — Wenderoth, Lind & Ponack, L.L.P.

(57) ABSTRACT

A motor assembly includes an electric motor and a speed reducing mechanism. The speed reducing mechanism includes: a housing; an internal gear supported by the inner diameter surface of the housing; eccentric disks capable of rotating inside the internal gear when the rotating shaft of the electric motor rotates; an output shaft having at the axial end thereof a cage rotatably disposed between the internal gear and the eccentric disks, the cage being arranged coaxially with the rotation axis of the eccentric disks; and rolling elements retained by the cage and meshing with internal teeth of the internal gear, the number of the rolling elements being smaller than the number of the internal teeth. The eccentric disks are provided on the rotating shaft of the electric motor.

11 Claims, 8 Drawing Sheets

(56) References Cited

U.S. PATENT DOCUMENTS

| | | | |
|---|---|---|---|
| 8,562,473 B2 * | 10/2013 | Ishikawa et al. | 475/168 |
| 2002/0010049 A1 * | 1/2002 | Forsyth | 475/207 |
| 2005/0184265 A1 | 8/2005 | Aoki et al. | |

FOREIGN PATENT DOCUMENTS

| | | |
|---|---|---|
| JP | 2000-092782 | 3/2000 |
| JP | 2002-068070 | 3/2002 |
| JP | 2004-019938 | 1/2004 |
| JP | 2004-104902 | 4/2004 |
| JP | 2007-028700 | 2/2007 |
| JP | 2007-303561 | 11/2007 |
| JP | 2010-038362 | 2/2010 |
| JP | 2010038362 A1 * | 2/2010 |

OTHER PUBLICATIONS

Written Opinion of the International Searching Authority issued Sep. 18, 2012 in International (PCT) Application No. PCT/JP2012/067690 (with English translation).

* cited by examiner

MOTOR ASSEMBLY WITH SPEED REDUCER

TECHNICAL FIELD

The present invention relates to a motor assembly with a speed reducer in which the rotation speed of the rotating shaft of an electric motor is reduced by the speed reducer and the reduced rotation speed is output from an output shaft.

BACKGROUND ART

A roller type speed reducer is disclosed Japanese Unexamined Patent Application Publication No. S62-93565. This roller type speed reducer includes an input shaft and an output shaft coaxially arranged such that axial ends of the input and output shafts face each other. An internal gear having on its inner periphery a plurality of internal teeth having a curved shape is supported by housings covering the axial ends of the input and output shafts. The input shaft is provided at its axial end with two eccentric disks rotatable inside the internal gear and spaced axially from each other. The output shaft is provided at its axial end with a cage arranged between the internal gear and bearings press-fitted to the outer diameter surfaces of the eccentric disks. The cage is formed with a plurality of circumferentially equidistantly spaced apart pockets, the number of which is smaller than that of the internal teeth, to face the respective eccentric disks. Rolling elements in the form of rollers are received in the respective pockets, the rolling elements being configured to roll along the outer diameter surfaces of the bearings and to mesh with the internal teeth of the internal gear successively.

In the speed reducer configured as described above, the rolling elements mesh with the internal teeth of the internal gear successively when the input shaft and thus the eccentric disks rotate. The rolling elements are moved in the circumferential direction by the distance equal to the width of one tooth of the internal teeth per rotation of the input shaft, so that the output shaft rotates at a reduced speed relative to the input shaft.

In order to smoothly transmit rotation, in the speed reducer described in Japanese Unexamined Patent Application Publication No. S62-93565, the tooth shape of each internal tooth is identical to the (curved) trajectory of the outermost portion of one rolling element, which is parallel to the trajectory of the center of the rolling element, when the output shaft rotates within one pitch of the internal teeth of the internal gear, and the eccentric disks rotate correspondingly such that all of the rolling elements contact the internal teeth.

The conventional roller type speed reducer described above is generally used to reduce the rotation speed of an electric motor connected to the speed reducer. In conventional motor assemblies including the above-described motor and speed reducer, since the rotating shaft of the electric motor is connected to an input shaft of the roller type speed reducer by a shaft coupling, the motor assembly tends to be large in size. As a result thereof, it is necessary to secure large space for mounting such a motor assembly in various devices.

Furthermore, in such conventional roller type speed reducers, the input shaft is integrally formed with eccentric disks by which rolling elements mesh with internal teeth of an internal gear successively, so that the eccentric disks rotate together with the input shaft at all times. Therefore, if excessive torque is applied to the input shaft suddenly, the rolling elements may get stuck and locked between the tooth surfaces of the internal teeth and the outer diameter surfaces of bearings press-fitted to the outer diameter surfaces of the respective eccentric disks. In light thereof, conventional roller type speed reducers need to be improved in order to enhance reliability.

SUMMARY OF THE INVENTION

It is a first object of the present invention to provide a small and compact motor assembly with a roller type speed reducer in which the rotation speed of the electric motor is reduced by the speed reducer and the reduced rotation speed is output.

It is a second object of the present invention to provide a speed reducer which can prevent the occurrence of a lock phenomenon in the speed reducing mechanism if excessive torque is applied to the eccentric disks, and thus is reliable.

In order to achieve the first object described above, the present invention provides a motor assembly including: an electric motor having a rotating shaft; and a speed reducing mechanism configured to reduce the rotation speed of the rotating shaft of the electric motor and output the reduced rotation speed. The speed reducing mechanism includes: a housing; an internal gear supported by the inner diameter surface of the housing; eccentric disks capable of rotating inside the internal gear when the rotating shaft of the electric motor rotates; an output shaft having at the axial end thereof a cage rotatably disposed between the internal gear and the eccentric disks, the cage being arranged coaxially with the rotation axis of the eccentric disks; and rolling elements retained by the cage and meshing with internal teeth of the internal gear, the number of the rolling elements being different from the number of the internal teeth. In the motor assembly, the rolling elements are configured to mesh with the internal teeth successively due to rotation of the eccentric disks, whereby the output shaft is rotated at a reduced speed which is determined by the difference between the number of the internal teeth and the number of the rolling elements, per rotation of the eccentric disks. Also, the rotating shaft of the electric motor has an extended portion extended into the speed reducing mechanism, the eccentric disks are mounted on the extended portion of the rotating shaft such that rotation of the rotating shaft is transmitted to the eccentric disks, and the electric motor and the speed reducing mechanism are mounted in a common housing.

As described above, because the rotating shaft of the electric motor has the extended portion extended into the speed reducing mechanism, and the eccentric disks are mounted on the extended portion of the rotating shaft, it is possible to shorten greatly the axial length of the rotating shaft and to obtain a small and compact motor assembly compared to an arrangement where the rotating shaft of the electric motor is connected to an input shaft of a speed reducer by a shaft coupling.

It is also possible to reduce costs, because the number of parts to be used is reduced by using the common housing for both the electric motor and the speed reducer.

In the motor assembly according to the present invention, the eccentric disks are rotationally fixed to the rotating shaft by means of fitting in order to transmit rotation of the rotating shaft to the eccentric disks. Also, the eccentric disks may be rotationally fixed thereto by means of press-fitting, a key, or a spline.

If a separation wall is provided to separate the space inside the common housing into a motor receiving space and a speed reducer receiving space, and a bearing is incorporated in the inner diameter surface of a shaft inserting hole formed in the separation wall to rotatably support the rotating shaft, the rotating shaft and the eccentric disks can rotate accurately without whirling.

In this case, it is possible to prevent lubricating oil, with which the speed reducer receiving space is filled, from leaking into the motor receiving space so as not to adversely affect the electric motor by using the bearing having seals.

It is possible to more positively prevent lubricating oil from leaking into the motor receiving space by incorporating an oil seal between the inner diameter surface of the shaft inserting hole formed in the separation wall and the outer diameter surface of the rotating shaft.

In order to achieve the second object described above, in a second aspect of the present invention, the eccentric disks of the motor assembly according to the first aspect of the present invention are rotatably supported by the rotating shaft, and a torque limiter mechanism is provided between the eccentric disks and the rotating shaft. The torque limiter mechanism is configured to stop transmission of torque from the rotating shaft to the eccentric disks if torque applied to the eccentric disks exceeds a predetermined torque value when rotation of the rotating shaft is transmitted to the eccentric disks.

By providing the torque limiter mechanism between the rotating shaft and the eccentric disks as described above, the torque limiter mechanism starts to function if torque applied to the eccentric disks exceeds a predetermined torque value of the torque limiter mechanism, so that transmission of rotation torque from the rotating shaft to the eccentric disks is stopped and the rotating shaft idles.

Therefore, the eccentric disks are not loaded with torque that exceeds a predetermined torque value of the torque limiter mechanism, so that the lock phenomenon does not occur in a speed reducing mechanism where a rotation speed of the rotating shaft is reduced by rolling elements meshing with internal teeth of an internal gear successively.

The torque limiter mechanisms configured as described below (a, b and c) can be used here:

a: the torque limiter mechanism configured such that the eccentric disks are press-fitted to the rotating shaft with an interference so that if excessive torque is applied to the eccentric disks, slippage occurs between the press-fitted surfaces of the rotating shaft and the eccentric disks.

b: the torque limiter mechanism configured such that: the eccentric disks are rotatably fitted to the rotating shaft; the rotating shaft is provided with flanges axially facing the eccentric disks; and the eccentric disks are press-fitted to the flanges by applying pressing force of an elastic member to the eccentric disks so that if excessive torque is applied to the eccentric disks, slippage occurs between the press-fitted surfaces of the eccentric disks and the flanges.

c: the torque limiter mechanism configured such that: the eccentric disks are rotatably fitted to the rotating shaft; a circumferentially corrugated ring is fitted between the fitting surfaces of the eccentric disks and the rotating shaft; and the circumferentially continuous corrugations of the corrugated ring is are kept in elastic contact with the outer diameter surface of the rotating shaft and the inner diameter surfaces of the eccentric disks so that if excessive torque is applied to the eccentric disks, slippage occurs between the elastic contact surfaces of the corrugated ring and the rotating shaft or between the elastic contact surfaces of the corrugated ring and the eccentric disks.

In the torque limiter mechanism configured as described in the above b, the elastic member may be a wave spring, a disk spring, a coil spring, an elastic plate made of rubber, an elastic plate made of synthetic resin, and so on.

If the elastic member is a member such as a wave spring, a circumferential part of which is separated, the elastic member may be radially expanded by centrifugal force and elastic force to press the eccentric disks may change due to the radial expansion thereof so as to change a torque limiter value. In order to prevent such a phenomenon, it is preferable that annular walls, radially facing the outer surfaces of the elastic member, are formed on the surfaces of the respective eccentric disks that are in contact with the elastic member so as to prevent the radial expansion of the elastic member.

In the speed reducing mechanism according to the first aspect of the present invention, because the rotating shaft of the electric motor has the extended portion extended into the speed reducing mechanism, and the eccentric disks are mounted on the extended portion of the rotating shaft as described above, it is possible to obtain a small and compact motor assembly.

It is also possible to reduce costs, because the number of parts to be used is reduced by using the common housing for both the electric motor and the speed reducing mechanism.

In the second aspect of the present invention, because the torque limiter mechanism starts to function if torque applied to the eccentric disks exceeds a predetermined torque value of the torque limiter mechanism, it is possible to stop rotation transmission of torque from the rotating shaft to the eccentric disks due to the torque limiter mechanism provided between the rotating shaft and the eccentric disks as described above. As a result thereof, it is possible to prevent the occurrence of the lock phenomenon in the speed reducing mechanism where a rotation speed of the rotating shaft is reduced and thus to obtain a speed reducer having high reliability.

DETAILED DESCRIPTION OF THE INVENTION

Figure 1:
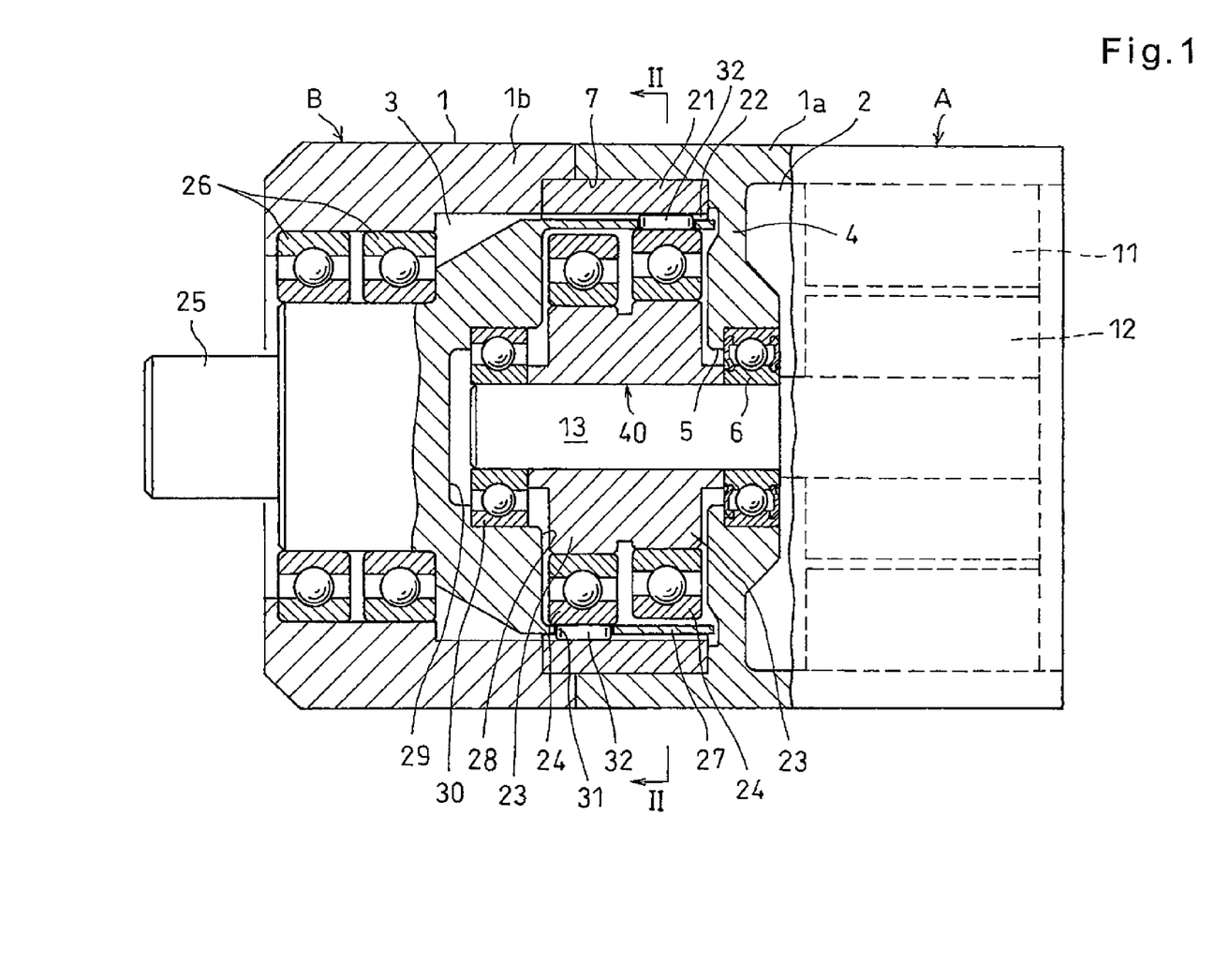
FIG. 1 is a longitudinal sectional view illustrating an embodiment of a motor assembly with a speed reducer according to the present invention.

The embodiments of the present invention are now described with reference to the drawings. FIG. 1 illustrates a motor assembly with a speed reducer according to a first embodiment of the present invention. As illustrated in FIG. 1, the motor assembly includes an electric motor A, and a speed reducer B that reduces the rotation speed of the electric motor A and outputs the reduced speed. The electric motor A and the speed reducer B are received in a common housing 1.

The housing 1 has a cylindrical shape and is axially divided into a first divided housing portion 1a and a second divided housing portion 1b.

A separation wall 4 is provided inside the first divided housing 1a in such a way as to separate the space inside the housing 1 into a motor receiving space 2 and a speed reducer receiving space 3. The driving part of the electric motor A is incorporated in the motor receiving space 2, and the speed reducing mechanism of the speed reducer B is incorporated in the speed reducer receiving space 3.

The driving part of the electric motor A includes: a stator 11 fixed to the inner diameter surface of the first divided housing portion 1a; a rotor 12 that rotates inside the stator 11 when the stator 11 is energized; and a rotating shaft 13 extending along the rotational axis of the rotor 12 and configured to be rotated together with the rotor 12. The rotating shaft 13 extends through a shaft inserting hole 5 formed in the separation wall 4 and protrudes into the speed reducer receiving space 3.

Figure 3:
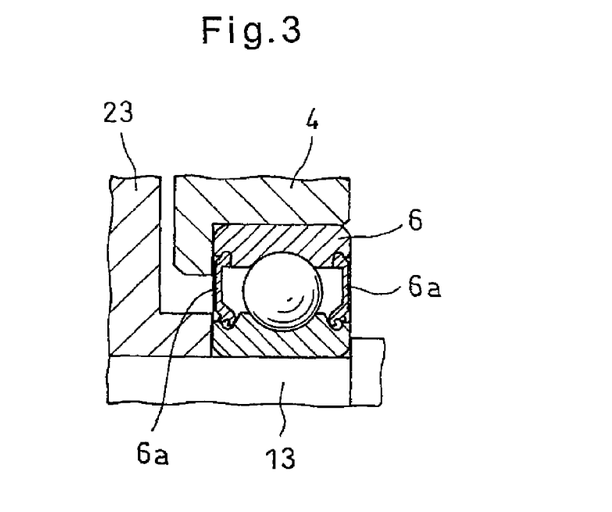
FIG. 3 is an enlarged sectional view of a supporting portion of a rotating shaft of FIG. 1.

A bearing 6 is incorporated inside the shaft inserting hole 5 to rotatably support the rotating shaft 13. As illustrated in FIG. 3, the bearing 6 includes seals 6a on the respective axial sides thereof to prevent lubricating oil that lubricates the speed reducing mechanism of the speed reducer B in the speed reducer receiving space 3 from leaking into the motor receiving space 2.

Figure 2:
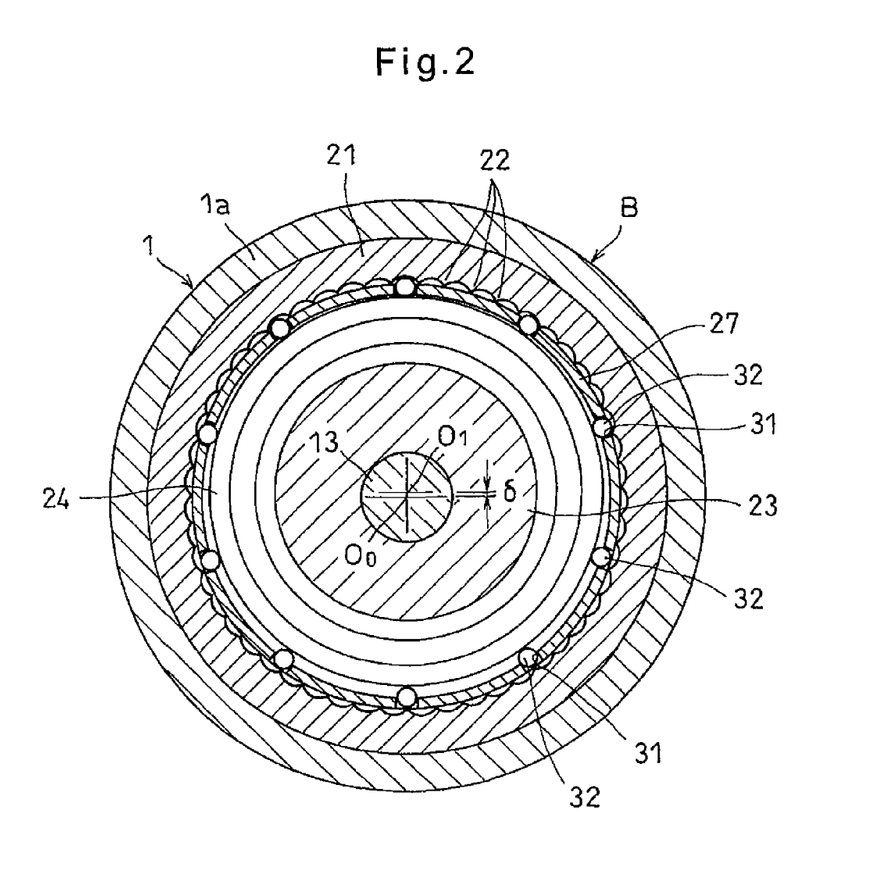
FIG. 2 is a sectional view taken along the line II-II of FIG. 1.

As illustrated in FIGS. 1 and 2, the speed reducer B includes: an internal gear 21 supported by the inner diameter surface of the housing 1; a pair of eccentric disks 23 that can rotate inside the internal gear 21; and an output shaft 25 extending along the rotational axis of the eccentric disks 23.

The internal gear 21 is integrally fixed to the housing 1 by being incorporated in a large diameter recess 7 formed in the inner diameter surfaces of the first divided housing portion 1a and the second divided housing portion 1b to extend across the abutment line thereof. The internal gear 21 has a large number of internal teeth 22 formed on its inner periphery.

The pair of eccentric disks 23 are rotationally fixed to the rotating shaft 13 of the electric motor A. In this embodiment, the disks are rotationally fixed to the shaft 13 by being press-fitted thereto.

The pair of eccentric disks 23 are arranged such that the centers of the cylindrical outer diameter surfaces thereof are circumferentially offset by 180 degrees from each other. Bearings 24, which are ball bearings, are press-fitted to the respective outer diameter surfaces thereof. The letter δ (delta) illustrated in FIG. 2 indicates the eccentricity amount (distance) of the centers $O_1$ of the cylindrical outer diameter surfaces of the eccentric disks 23 from the center $O_0$ of the rotating shaft 13.

The output shaft 25 is rotatably supported by bearings 26 in two rows incorporated in the second divided housing portion 1b at the open end thereof. A cage 27 is provided at the end of the output shaft 25 that faces the eccentric disks 23. The cage 27 is disposed between, and is rotatable relative to, the internal gear 21 and the eccentric disks 23.

Thus, the cage 27 is disposed between, and rotatable relative to, the bearings 24 on the eccentric disks 23 and the internal gear 21 facing each other therethrough. The cage 27 is a cup-shaped member and thus has an end wall. A bearing 30 is incorporated in a small diameter hole 29 formed in the center of the surface 28 of the end wall in which the axial end of the rotating shaft 13 is received.

A plurality of circumferentially equidistantly spaced apart pockets 31 are formed in double rows in the cage 27. The pockets 31 in the respective rows radially face the bearings 24 supported by the pair of respective eccentric disks 23. The plurality of pockets 31 in one of the rows are positioned so as to be circumferentially offset by a half pitch from the respective pockets 31 in the other row.

The number of the pockets 31 in the respective rows is smaller than that of the internal teeth 22 formed on the inner periphery of the internal gear 21. A rolling element 32 in the form of a roller is radially movably received in each of the pockets 31.

The rolling elements 32 can mesh with the internal teeth 22 of the internal gear 21. The internal teeth 22 have a curved shape, thus enabling the plurality of respective circumferentially spaced apart rolling elements 32 to contact the internal teeth 21 at the same time. In order to enable all of the rolling elements 32 to contact the internal teeth 21, as described in Japanese Unexamined Patent Application Publication No. S62-93565, the tooth shape of each internal tooth 21 is identical to the (curved) trajectory of the outermost portion of one rolling element 32, which is parallel to the trajectory of the center of the rolling element 32, when the output shaft 25 rotates within one pitch of the internal teeth 22 of the internal gear 21, and the eccentric disks 23 rotate correspondingly.

When the electric motor A of this embodiment is driven, rotation of the rotating shaft 13 is transmitted to the eccentric disks 23, so that the eccentric disks 23 rotate together with the rotating shaft 13.

The rolling elements 32 mesh with the internal teeth 22 of the internal gear 21 successively due to rotation of the eccentric disks 23, and are moved in the circumferential direction by the distance equal to the width of one tooth of the internal teeth 22 per rotation of the eccentric disks 23, so that the output shaft 25 rotates at a reduced speed.

The speed reducer B is lubricated by lubricating oil supplied to the speed reducer receiving space 3. If the lubricating oil, by which the speed reducer B is being lubricated, leaks into the motor receiving space 2, the electric motor A is adversely affected. However, in this embodiment, the bearing 6 having seals is incorporated inside the shaft inserting hole 5 of the separation wall 4, by which the motor receiving space 2 and the speed reducer receiving space 3 are separated, in such a way as to rotatably support the rotating shaft 13. This prevents leakage of lubricating oil into the motor receiving space 2.

The rotating shaft 13 is rotatably supported at its ends, between which there are the eccentric disks 23, by the bearing 6 and the bearing 30, which is incorporated in the small diameter hole 29 of the end surface 28 of the cage, respectively. Therefore, the rotating shaft 13 and the eccentric disks 23 rotate accurately without whirling and without generating vibration and noise.

In this embodiment, the eccentric disks 23 of the speed reducer B are provided on the rotating shaft 13 of the electric motor A so as not to be rotatable relative to the rotating shaft 13. Therefore, the motor assembly of this embodiment is short in axial length compared to an arrangement where the rotating shaft of the electric motor is connected to an input shaft of the speed reducer by a shaft coupling.

It is also possible to reduce costs, because the number of parts to be used is reduced by using the same housing for both the electric motor A and the speed reducer B.

Figure 4:
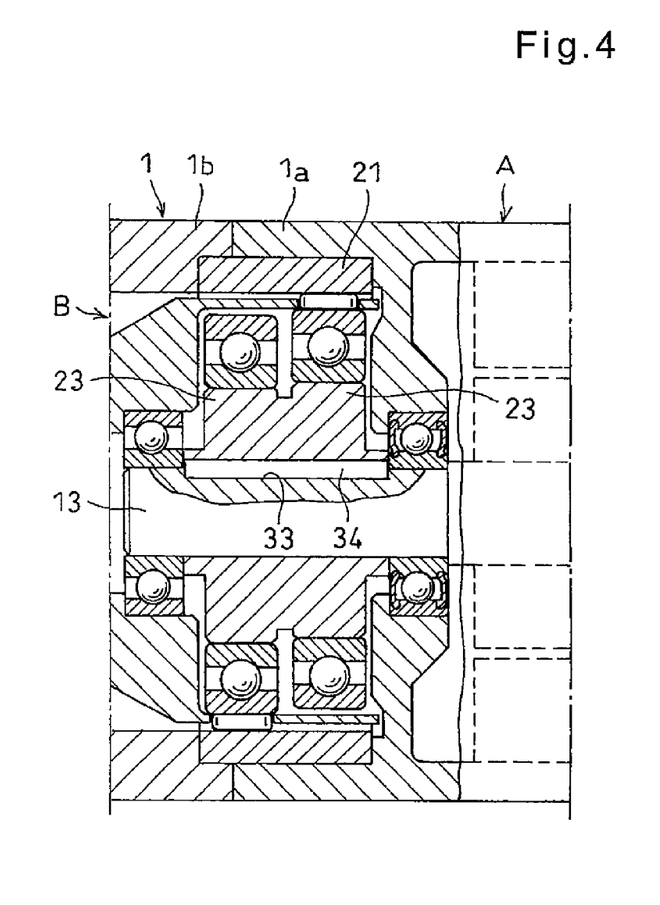
FIG. 4 is a sectional view illustrating how eccentric disks are rotationally fixed to the rotating shaft according to another example.
Figure 5:
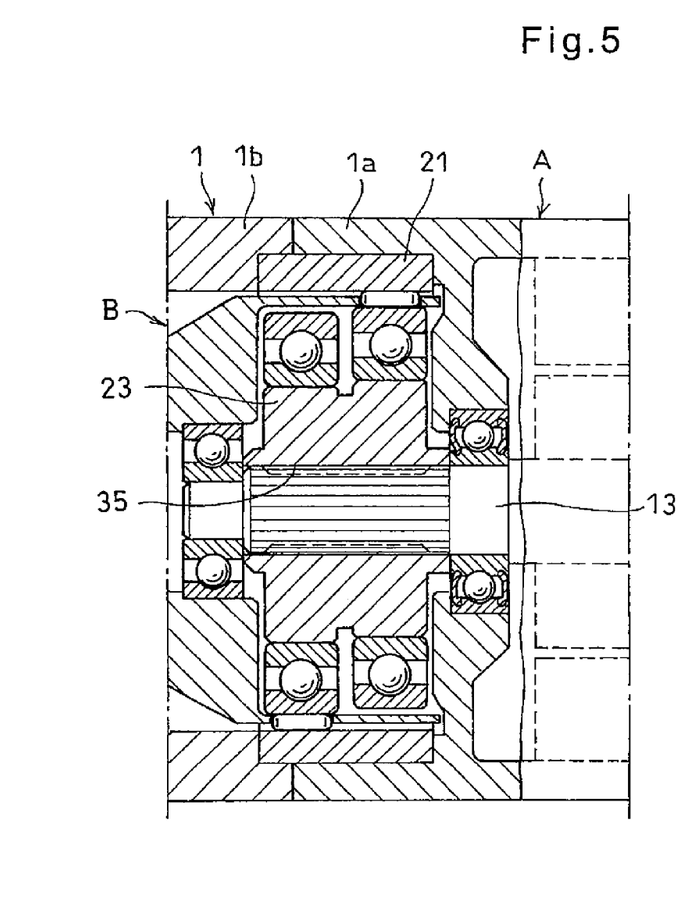
FIG. 5 is a sectional view illustrating how the eccentric disks are rotationally fixed to the rotating shaft according to another example.

In the first embodiment illustrated in FIG. 1, the eccentric disks 23 are press-fitted to the rotating shaft 13 so as not to be rotatable relative to the rotating shaft. However, it is possible to use another way other than press fitting to rotationally fix the eccentric disks to the rotating shaft. FIGS. 4 and 5 illustrate different ways to rotationally fix the eccentric disks 23 to the rotating shaft. In FIG. 4, the outer diameter surface of the rotating shaft 13 and the inner diameter surfaces of the eccentric disks 23 are formed with key grooves 33 and a key 34 is engaged in the key grooves 33 to prevent rotation of the eccentric disks 23 from rotating relative to the rotating shaft.

In FIG. 5, the rotating shaft 13 and the eccentric disks 23 are fitted together by means of splines 35 to prevent relative rotation of the eccentric disks 23

Figure 6:
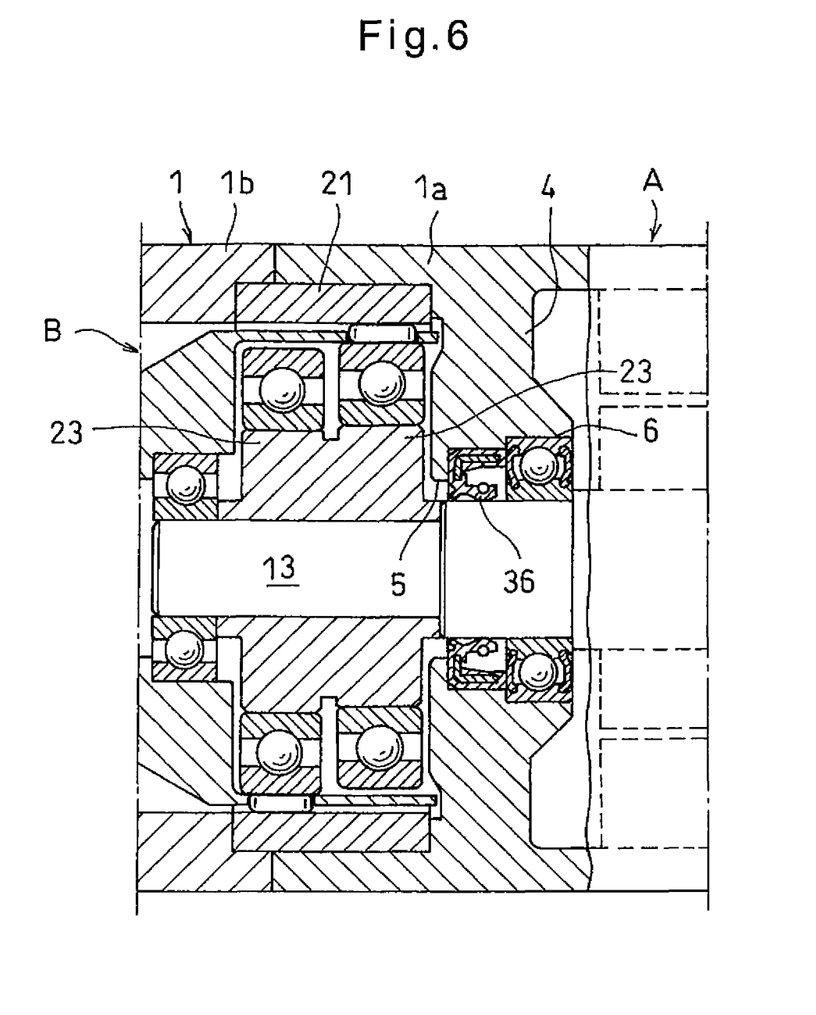
FIG. 6 is a longitudinal sectional view of a motor assembly of the present invention according to another embodiment.
Figure 7:
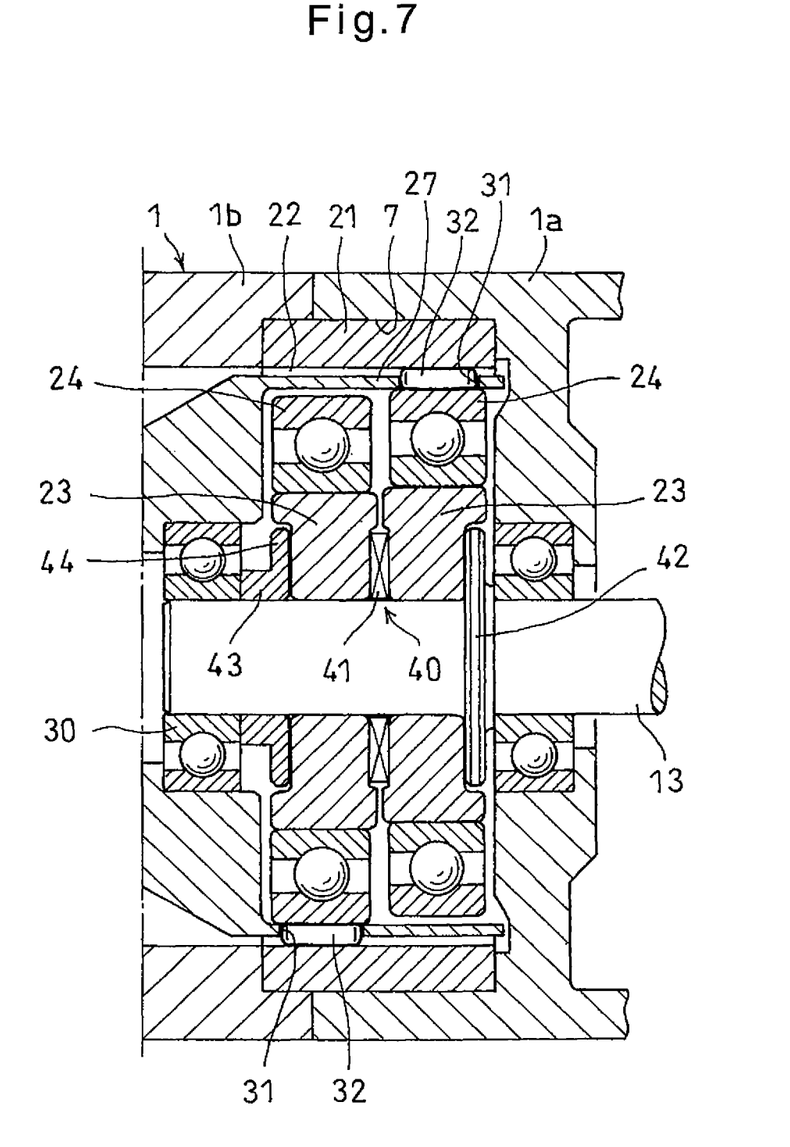
FIG. 7 is a longitudinal sectional view of a motor assembly of the present invention according to another embodiment.

FIG. 6 illustrates a motor assembly according to a second embodiment of the present invention. The motor assembly of this embodiment is different from that of the first embodiment as illustrated in FIG. 1 in that an oil seal 36 is incorporated between the inner diameter surface of the shaft inserting hole 5 formed in the separation wall 4 and the outer diameter surface of the rotating shaft 13. Therefore, as for elements corresponding to those of the motor assembly of the first embodiment, the same reference numerals used in the first embodiment are used, and their description is omitted.

In the second embodiment, it is possible to more positively prevent lubricating oil inside the speed reducer receiving space 3 from leaking into the motor receiving space 2 by incorporating the oil seal 36 between the inner diameter surface of the shaft inserting hole 5 and the outer diameter surface of the rotating shaft 13.

Though the pair of eccentric disks 23 of the speed reducer B are used in the first and second embodiments, the number of eccentric disks is optional and may be one or more than two.

Though the embodiments illustrate the roller type speed reducer B, in which the number of the rolling elements 32 is smaller than that of the internal teeth 22 of the internal gear 21, the number of the rolling elements 32 may be larger than that of the internal teeth 22.

In the arrangement in which the eccentric disks 23, by which the rolling elements 32 mesh with the internal teeth 22 of the internal gear 21 successively, are rotationally fixed to the rotating shaft 13 at all times, the rolling elements 32 can get stuck and locked between the tooth surfaces of the internal teeth 22 and the outer diameter surfaces of the bearings 24 press-fitted to the outer diameter surfaces of the eccentric disks 23 when excessive torque is applied to the rotating shaft 13 suddenly.

In FIG. 1, in order to enhance reliability of the motor assembly, the pair of eccentric disks 23 are press-fitted to the rotating shaft 13 with a predetermined interference so that the disks 23 and the shaft 13 serve as a torque limiter mechanism 40, which allows slippage between the press-fitted surfaces of the rotating shaft 13 and the eccentric disks 23 if torque applied to the eccentric disks 23 reaches a predetermined torque value.

As described above, the torque limiter mechanism 40 provided between the rotating shaft 13 and the eccentric disks 23 due to press-fitting prevents torque exceeding a predetermined torque amount of the torque limiter mechanism 40 from being applied to the eccentric disks 23. As a result thereof, the rolling elements 32 do not get stuck and locked on the tooth surfaces of the internal teeth 22.

Though FIG. 1 illustrates the torque limiter mechanism 40 configured such that the eccentric disks 23 are press-fitted to the rotating shaft 13 with an interference so that slippage occurs between the press-fitted surfaces thereof, the torque limiter mechanism 40 may be configured in another way.

FIGS. 7 through 13 illustrate different torque limiter mechanisms 40. In the torque limiter mechanism 40 illustrated in FIG. 7, the pair of eccentric disks 23 are rotatably fitted to the rotating shaft 23. An elastic member 41 is incorporated between the opposed surfaces of the pair of eccentric disks 23 to bias and move the pair of eccentric disks 23 away from each other. The elastic member 41 thus presses one of the eccentric disks 23 against a flange 42 integrally provided to the rotating shaft 13, and the other eccentric disk 23 against a flange 44 of a spacer 43 fitted to the axial end portion of the rotating shaft 13 and prevented from moving toward the axial end of the shaft 13 by the bearing 30. As a result thereof, if excessive torque is applied to each of the pair of eccentric disks 23, slippage occurs between the press-fitted surfaces of the eccentric disks 23 and the flanges 42, 44 so as to stop transmitting rotation from the rotating shaft 13 to the eccentric disks 23.

Figure 8:
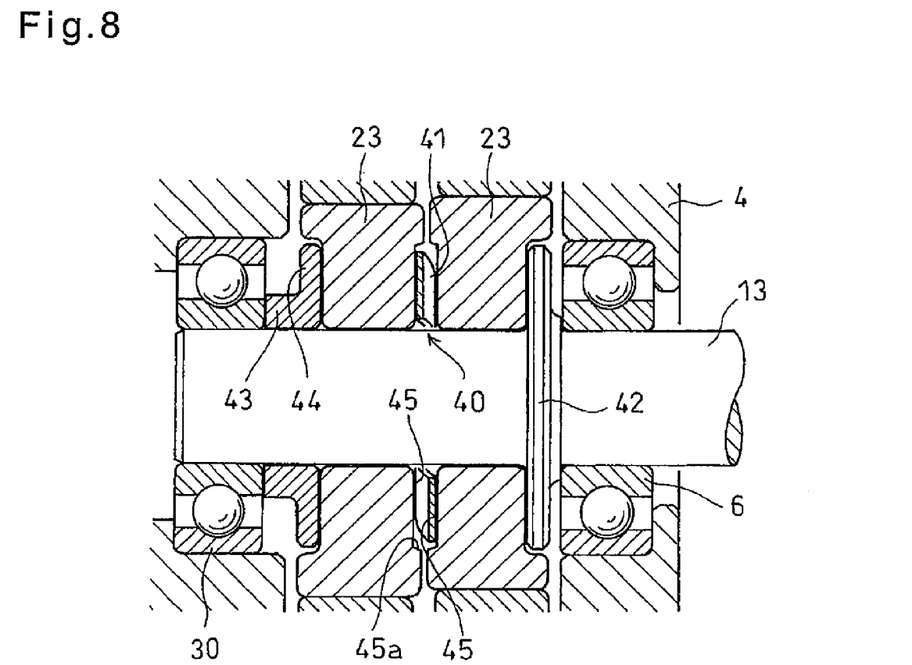
FIG. 8 is a sectional view showing one example of an elastic member of a torque limiter mechanism.
Figure 9:
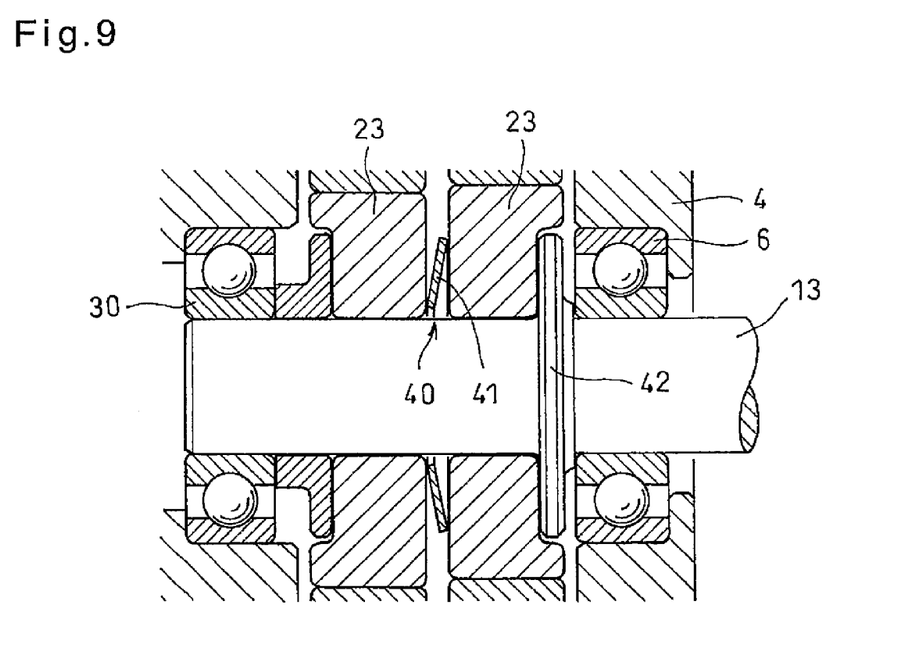
FIG. 9 is a sectional view showing another example of an elastic member of a torque limiter mechanism.
Figure 10:
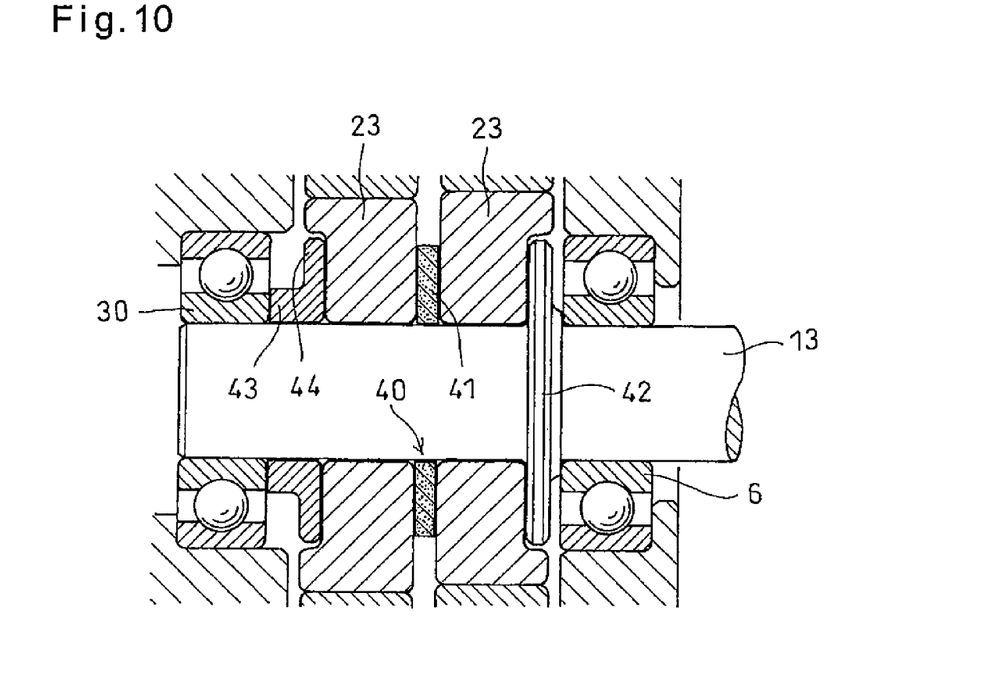
FIG. 10 is a sectional view showing another example of an elastic member of a torque limiter mechanism.

The elastic member 41 may be a wave spring, a disk spring, a coil spring, an elastic plate made of rubber, an elastic plate made of synthetic resin, and so on. The elastic member 41 in FIG. 8 is a wave spring. The elastic member 41 in FIG. 9 is a disk spring. The elastic member 41 in FIG. 10 is an elastic plate made of rubber.

If the elastic member 41 is of the type which is radially expanded by centrifugal force, pressing force may change due to the radial expansion thereof so as to change the torque limiter value. In order to prevent such a phenomenon, in the arrangement of FIG. 8, circular recesses 45 are formed on the surfaces of the respective eccentric disks 23 that are in contact with the elastic member 41 to receive the elastic member 41. With this arrangement, the radially outer annular walls 45a of the respective circular recesses 45 prevent the elastic member 41 from being radially expanded.

Figure 11:
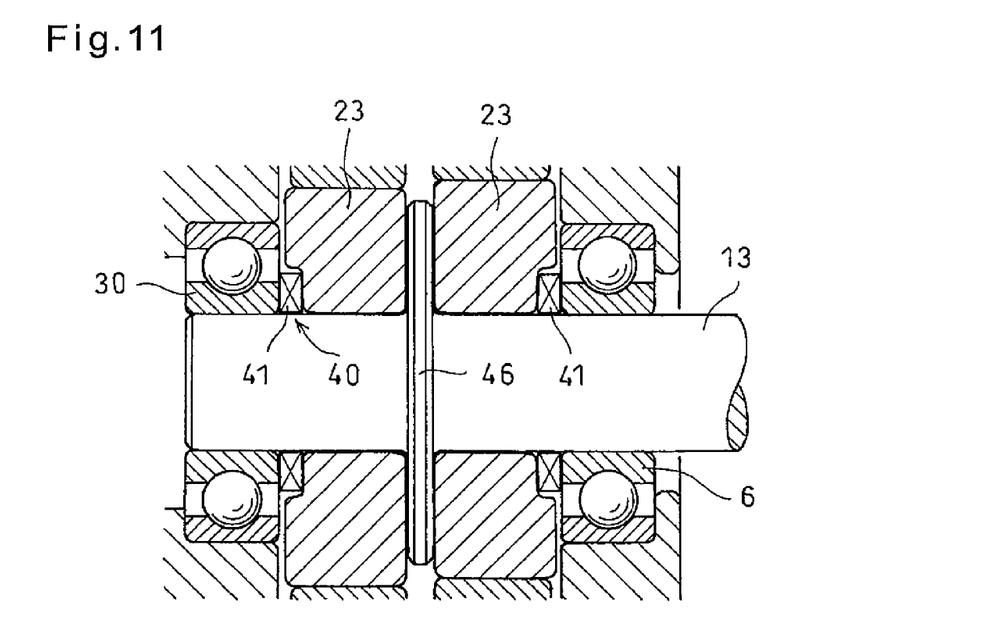
FIG. 11 is a sectional view of another example of a torque limiter mechanism.

In the torque limiter mechanism illustrated in FIG. 11, the pair of eccentric disks 23 are rotatably fitted to the rotating shaft 13. The rotating shaft 13 is integrally provided with a flange 46 arranged between the pair of eccentric disks 23. The eccentric disks 23 are pressed against the flange 46 by respective elastic members 41 incorporated between the eccentric disks 23 and the bearings 6 and 30. As a result thereof, if excessive torque is applied to each of the pair of eccentric disks 23, slippage occurs between the press-fitted surfaces of the eccentric disks 23 and the flange 46 so as to stop transmitting rotation from the rotating shaft 13 to the eccentric disks 23.

Figure 12:
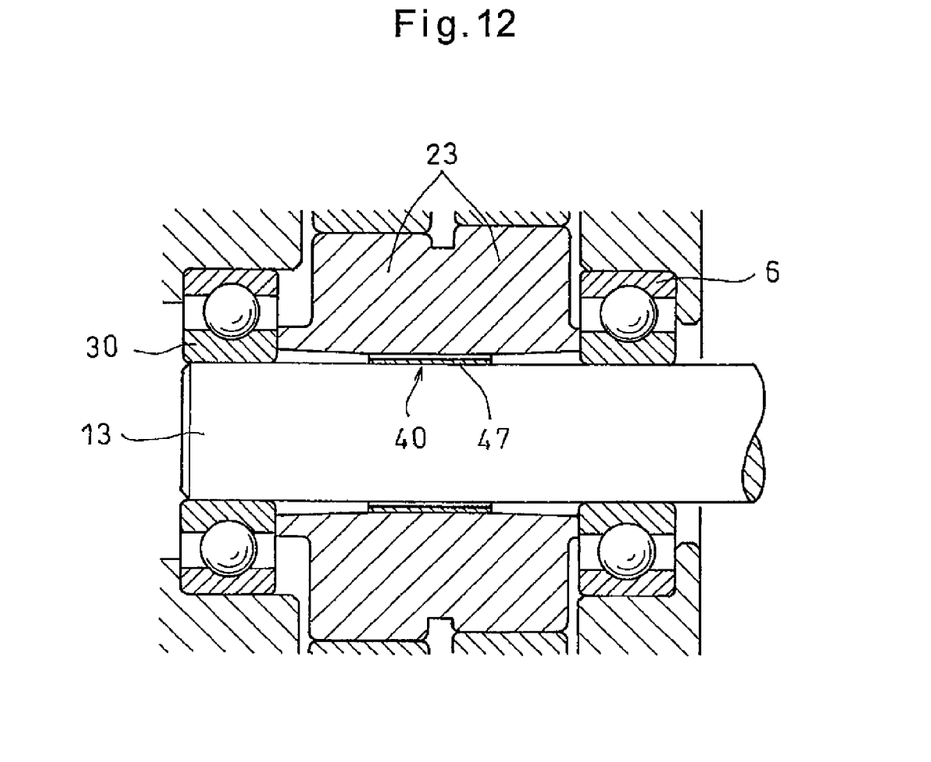
FIG. 12 is a sectional view showing another example of a torque limiter mechanism.
Figure 13:
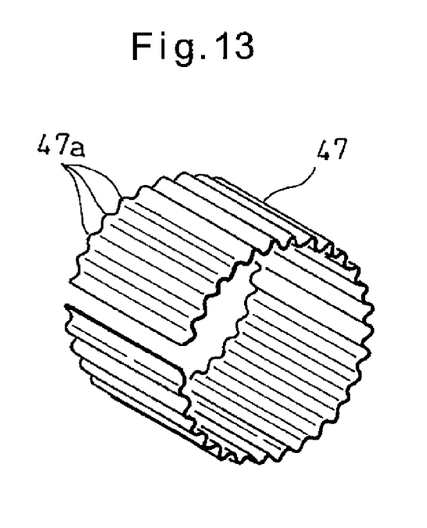
FIG. 13 is a perspective view of a corrugated ring.

In the torque limiter mechanism 40 illustrated in FIG. 12, a pair of integrated eccentric disks 23 are rotatably fitted to the rotating shaft 13. As illustrated in FIG. 13, a circumferentially corrugated ring 47 is fitted between the fitting surfaces of the integrated eccentric disks 23 and the rotating shaft 13. The circumferentially continuous corrugations 47a of the corrugated ring 47 are kept in elastic contact with the outer diameter surface of the rotating shaft 13 and the inner diameter surface of the eccentric disks 23. As a result thereof, if excessive torque is applied to the eccentric disks 23, slippage occurs between the elastic contact surfaces of the corrugated ring 47 and the rotating shaft 13 or between the elastic contact surfaces of the corrugated ring 47 and the eccentric disks 23.

In all of the torque transmitter mechanisms 40 illustrated in FIGS. 7 through 13, it is possible to prevent the occurrence of the lock phenomenon in a speed reducing mechanism where rotation speed of the rotating shaft 13 is reduced if excessive torque is applied to the eccentric disks 23.

The invention claimed is:
1. A motor assembly comprising:
   an electric motor having a rotating shaft; and
   a speed reducing mechanism configured to reduce a rotation speed of the rotating shaft of the electric motor and output a reduced rotation speed,
   the speed reducing mechanism including:
   a housing;
   an internal gear supported by an inner diameter surface of the housing;

an eccentric disk capable of rotating inside the internal gear when the rotating shaft of the electric motor rotates;

an output shaft having a cage at an axial end of the output shaft, wherein the cage is rotatably disposed between the internal gear and the eccentric disk, the cage being arranged coaxially with a rotation axis of the eccentric disk; and rolling elements retained by the cage and meshing with internal teeth of the internal gear, a number of the rolling elements being different from a number of the internal teeth, wherein the rolling elements are configured to mesh with the internal teeth successively due to rotation of the eccentric disk, whereby the output shaft is rotated at a reduced speed which is determined by a difference between the number of the internal teeth and the number of the rolling elements, per rotation of the eccentric disk, wherein the rotating shaft of the electric motor has an extended portion extended into the speed reducing mechanism, wherein the eccentric disk is mounted on the extended portion of the rotating shaft such that rotation of the rotating shaft is transmitted to the eccentric disk, wherein the electric motor and the speed reducing mechanism are mounted in a common housing, wherein the eccentric disk is rotatable relative to an input shaft, and wherein a torque limiter mechanism is provided between the eccentric disk and the rotating shaft, the torque limiter mechanism being configured to allow transmission of torque from the rotating shaft to the eccentric disk while the torque is not larger than a predetermined torque value, and to stop transmission of the torque if the torque exceeds the predetermined torque value.

2. The motor assembly according to claim 1, wherein the torque limiter mechanism is configured such that the eccentric disk is press-fitted to the rotating shaft with an interference such that slippage occurs between press-fitted surfaces of the rotating shaft and eccentric disk if excessive torque is applied to the eccentric disk.

3. The motor assembly according to claim 1, wherein the torque limiter mechanism is configured such that the eccentric disk is rotatably fitted to the rotating shaft, a circumferentially corrugated ring is fitted between fitting surfaces of the eccentric disk and the rotating shaft, and circumferentially continuous corrugations of the corrugated ring are pressed against an outer diameter surface of the rotating shaft and an inner diameter surface of the eccentric disk such that slippage occurs between elastic contact surfaces of the corrugated ring and the rotating shaft or between elastic contact surfaces of the corrugated ring and the eccentric disk if excessive torque is applied to the eccentric disk.

4. The motor assembly according to claim 1, wherein a separation wall is provided to separate space inside the housing into a motor receiving space and a speed reducer receiving space, and a bearing is incorporated in an inner diameter surface of a shaft inserting hole formed in the separation wall to rotatably support the rotating shaft.

5. The motor assembly according to claim 4, wherein the bearing has a seal.

6. The motor assembly according to claim 5, wherein an oil seal is incorporated between the inner diameter surface of the shaft inserting hole and an outer diameter surface of the rotating shaft.

7. The motor assembly according to claim 4, wherein an oil seal is incorporated between the inner diameter surface of the shaft inserting hole and an outer diameter surface of the rotating shaft.

8. The motor assembly according to claim 1, wherein the torque limiter mechanism is configured such that the eccentric disk is rotatably fitted to the rotating shaft, the rotating shaft is provided with a flange axially facing the eccentric disk, and an elastic member is arranged to apply pressing force to the eccentric disk to press the eccentric disk against the flange such that slippage occurs between press-fitted surfaces of the eccentric disk and the flange if excessive torque is applied to the eccentric disk.

9. The motor assembly according to claim 8, wherein the elastic member is one of a wave spring, a disk spring, a coil spring, an elastic plate made of rubber, and an elastic plate made of synthetic resin.

10. The motor assembly according to claim 9, wherein surfaces of the eccentric disk that are in contact with the elastic member are provided with annular walls radially facing an outer diameter surface of the elastic member so as to prevent the elastic member from being radially expanded.

11. The motor assembly according to claim 8, wherein surfaces of the eccentric disk that are in contact with the elastic member are provided with annular walls radially facing an outer diameter surface of the elastic member so as to prevent the elastic member from being radially expanded.

* * * * *